United States Patent [19]

Haeussler

[11] 4,394,201
[45] Jul. 19, 1983

[54] CONCRETE SLAB ASSEMBLY, ESPECIALLY FOR BUILDING FACADES

[76] Inventor: Ernst Haeussler, Grashofstr. 47, 4300 Essen 1, Fed. Rep. of Germany

[21] Appl. No.: 334,595

[22] Filed: Dec. 28, 1981

Related U.S. Application Data

[62] Division of Ser. No. 202,746, Oct. 31, 1980.

[51] Int. Cl.³ .................... B32B 31/16; E04B 2/28
[52] U.S. Cl. .................... 156/73.6; 52/378;
 52/405; 52/410; 52/650; 52/686; 156/42;
 156/92; 156/242; 156/292; 264/69; 264/274;
 428/119; 428/120; 428/213; 428/371; 428/703
[58] Field of Search ........... 52/378, 309.11, 302,
 52/378, 381, 382, 383, 405, 410, 426, 565, 600,
 650, 652, 678, 686, 687, 704, 706, 677; 428/119,
 120, 213, 371, 703; 264/69, 228, 274; 156/42,
 73.6, 91, 92, 242, 245, 292

[56] References Cited

U.S. PATENT DOCUMENTS

| | | | |
|---|---|---|---|
| 2,781,658 | 2/1957 | Dobell | 264/228 |
| 3,026,652 | 3/1962 | Helmerson et al. | 264/228 |
| 3,255,558 | 6/1966 | Middendorf | 264/228 |
| 3,579,931 | 5/1971 | Lang | 264/228 |
| 3,757,482 | 9/1973 | Haeussler | 52/410 |
| 3,996,713 | 12/1976 | Haeussler | 52/410 |
| 4,234,633 | 11/1980 | Gowetski et al. | 428/36 |
| 4,288,951 | 9/1981 | Carlson et al. | 52/410 |

*Primary Examiner*—Edward C. Kimlin
*Assistant Examiner*—Timothy W. Heitbrink
*Attorney, Agent, or Firm*—Karl F. Ross

[57] ABSTRACT

A concrete plate assembly, e.g. as load carrying members or for building facades, comprises an inner concrete slab, an outer concrete slab spaced from the inner slab, and at least one main or stress-absorbing anchor embedded and interconnecting the slabs which are reinforced. The intervening space can be filled with an insulation and/or can constitute an insulating air space. According to the invention, at least one of the concrete slabs in the region of the connecting anchor, is provided with a closed reinforcing ring which lies in the plane of the slab, preferably midway of the cross section thereof, the anchor being embedded in the concrete within the reinforcing ring and preferably centrally thereof.

4 Claims, 11 Drawing Figures

CONCRETE SLAB ASSEMBLY, ESPECIALLY FOR BUILDING FACADES

This is a division of application Ser. No. 202,746, filed Oct. 31, 1980.

FIELD OF THE INVENTION

My present invention relates to concrete slab assemblies or so-called composite or sandwich slab structures adapted to form facade panels, structural elements for walls or facing elements for buildings, and the like consisting of a pair of substantially coextensive reinforced concrete slabs in spaced-apart relationship to define an insulation layer between them, connectors or anchors traversing the insulating layer and being embedded in the concrete slabs forming the inner and outer members of the panel.

BACKGROUND OF THE INVENTION

In modern efforts to prefabricate structural elements, it has become common to use as inner or outer structural walls of buildings of all types, multilayer panels which can be provided as structural (load-bearing) or facing elements and which can comprise inner and outer reinforced-concrete slabs joined by at least one connector or anchor traversing the space between the slabs, this space being filled with an insulation or being reserved as an insulating air space or being a combination insulation and air space.

Such slabs are prefabricated and transported to the construction site where they are erected and anchored in place in the structure, serving as facade or structural elements.

Attention is directed to U.S. Pat. Nos. 3,757,482 and 3,996,713 and the publications mentioned in the files of these patents for an overview of sandwich slab construction techniques, anchor arrangements and the like.

The composite panels referred to above generally include flat arrays of reinforcing bars to which the connecting anchor can be affixed, and various anchor arrangements in the form of plates or membrane sheets. A tubular anchor can be provided at the centroid of at least a portion of the panel while the membrane or sheet anchors can be spaced about the centroid.

The high-stability composite panels can be load-carrying members as well as facing members and thus can be used for floors, roofs or walkway structures as well as for walls.

The thermal barrier or insulation between the two reinforced-concrete slabs may be of the single layer of multilayer type, with or without intervening trapped-air spaces, although the gap between the two plates may also be empty so that the insulation consists exclusively of a trapped-air space.

Connecting or main anchors, as this term is used for the purposes of the instant disclosure, are anchors which maintain a static connection between the reinforced-concrete inner plate and the reinforced-concrete outer plate and thus are correspondingly dimensioned.

Several such anchors can be provided for each panel, i.e. to connect each pair of coextensive slabs, although it is also possible to use a single connecting anchor which, as described, is advantageously located at the centroid of the panel.

These connecting anchors or compound anchors, because of the nature of their function, may be combined with auxiliary anchors such as hairpin anchors and the like which do not materially contribute to static support of one slab on the other. They serve primarily to discourage separation of the panels while torque and like stresses are absorbed mainly at the compound anchor. When reference is made herein to a compound or main anchor, therefore, it will be understood that this term can refer to the single anchor located at the centroid, or a plurality of anchors providing static support whether located at the centroid or not as long as they contribute to a significant degree to the static stability of the panel. A reference to an anchor in the singular will thus also be understood to be a reference to each anchor of a given panel assembly when more than one anchor is provided.

The compound anchor or anchors of the conventional structure are secured directly to the reinforcement members of the respective concrete plates by being tied, welded or linked thereto.

In the fabrication of the panels, the reinforcement of a first slab is assembled in a generally horizontal form and the anchor affixed thereto before pouring of the concrete of the first slab. The concrete is compacted by vibration and, after setting, means is applied to the slab to form the insulating gap. When the gap is filled with an insulation layer, this layer is applied so that the anchor projects therefrom. When the insulating space is empty, i.e. is to form a trapped-air space, a layer of sand can be applied to the first slab so that the anchor projects from this layer. The sand ultimately may be poured from the gap between the two slabs.

A second reinforcement structure is then assembled on this layer and connected to the anchor, whereupon the concrete of the second slab is poured and compacted by vibration.

This method of making facade panels has been found to give rise to several disadvantages.

When a planar concrete slab is fabricated in a horizontal form or bed, especially when vibration is used to compact the slab, there is a certain degree of separation of light components from heavier components. For example, the heavier components of the aggregate tend to sink to the bottom while the lighter components tend to be segrated at the upper surface of the slab. The upper surface therefore is found to have a higher concentration of water-rich cement while the lower layer has a greater concentration of heavier components of the aggregate and less water-rich cement. The slab, upon setting, has a higher density layer along the surface forming the underside which also may be of greater strength while the opposite face of the slab may have a lower density and less strength. The slab is not uniform throughout its cross section and deterioration can result.

Upon hardening and drying of the slab, moreover, the shrinkage effects on the two sides may differ with the upper layer shrinking more rapidly than the lower layer. When this occurs, the slab tends to bow and become downwardly convex. The convex surface, in panels of the type described, usually is the outer surface of the panel.

When the panel is formed from two slabs fabricated in this manner, both slabs have this tendency to bow. This bowing is highly undesirable and creates significant problems when the panels are used as facade or structural plates.

Especially problematic are panels of this type in which the space between the two slabs serves to receive an insulating layer and also as a trapped-air layer.

Panels of the latter type are particularly desirable in the assembly of prefabricated units as structural elements because they give better insulating capacity than so-called three-layer panels in which the space between the concrete slabs is entirely filled with thermal insulating solids.

The improved panels can be made in a first of the known methods by forming a first reinforced concrete slab with its reinforcement in a horizontal formwork bed, applying to this slab a so-called kubby foil while the surface of the slab is fresh, applying the insulator layer to the knubby foil and thereafter casting the other concrete slab with its reinforcement on the insulating layer.

This system has the disadvantage that the knubby foils are expensive and, because they are composed of synthetic resins, are generally flammable which may render the panels in violation of ordinances or codes barring the use of flammable materials.

In most cases, especially where the panel is to have a dead air space, combustible materials must be excluded. Knubby foils of nonflammable or noncombustible materials are so expensive that their use is impractical.

In a second process for fabricating panels with air spaces and insulating solids, the first reinforced concrete slab is made in the horizontal formwork and a separate foil is then applied, whereupon sand is deposited on this foil to the desired thickness of the air layer. The heat insulating material is then applied in the form of plates to the sand layer and the load-carrying inner concrete slab is then formed upon the insulating layer. The sand is removed. The air layer which should have the desired thickness, is then found to vary in thickness over the surfaces of the two slabs. Furthermore, one or the other of the slabs may be found to have thin spots. The static strength properties of such panels cannot readily be calculated and production of the panels is not reproducible. At some locations, it is not possible to satisfactorily embed the connecting anchor in the second slab, or even the first slab when the sand and insulating layers are applied while the first slab is still fresh or incompletely set.

The use of the sand has also been found to be costly and inconvenient and even when the panels are being erected, there may be significant amounts of sand which pour from the gap.

In a third method, the slabs are cast in formwork beds with openings in the lateral formwork.

Initially the lower or outer reinforced concrete slab is formed by pouring concrete around the reinforcement layered in the bed. Through the openings in the lateral formwork, conical planks are inserted and laid on the fresh concrete to serve as spacers. The heat insulating layer is then applied and the second slab is formed. After hardening of the concrete the conical blanks are withdrawn by hydraulic presses. Formwork beds of this type constitute expensive molds and the numerous additional manipulation to which the operation must be subject renders the panel production highly expensive.

OBJECTS OF THE INVENTION

It is the principal object of the present invention to provide a composite reinforced concrete panel of improved strength and stability.

Another object of the invention is to provide an improved composite panel of the two-slab type whereby the connection of the anchor to the slabs is significantly stronger then heretofore.

Still another object of my invention is to provide an improved composite panel having a pair of slabs between which both an air space and an insulating layer are formed, the panel being free from disadvantages of prior art structures.

A further object of the instant invention is to provide an improved method of making a composite panel at relatively low cost, with a minimum number of steps and with inexpensive equipment.

It is also an object of the invention to provide an essentially simple method of fabricating double-slab panels for facade and structural purposes which can have, in a particularly convenient manner, both an intermediate insulating layer and an air layer or space.

SUMMARY OF THE INVENTION

These objects and others which will become apparent hereinafter are attained, in accordance with the present invention, in a composite panel structure which comprises an inner reinforced concrete slab, an outer reinforced concrete slab spaced from the inner slab across an insulation space which can be completely filled with a solid insulating layer or partially filled with such a layer to define insulating air spaces, and main anchor means embedded in the concrete of both slabs, traversing said insulating space and absorbing all of the stresses applied between the slabs upon, for example, anchoring the inner slab to a support when the panel is used as a structural or facade plate. The anchor means includes at least one anchor traversing the insulating space disposed at the centroid of the slabs and can include, in addition, anchors of the same or different configuration at locations spaced around the centroid and close to the edges of the slabs.

According to an essential feature of this aspect of the invention, the or each main anchor is spacedly surrounded in at least one of the concrete slabs in which one of its ends is embedded with a periphery closed reinforcement ring whose ring plane coincides with the slab plane, the main anchor being disposed centrally of this ring. The main anchor is set in the center of this ring and embedded in the concrete in which the ring is likewise embedded. Advantageously, the bond between the concrete of the slab and the end of the main anchor embedded therein (and surrounded by the ring of the present invention) is formed by vibratory compaction. The latter can result from vibrating the main anchor while inserting it into the concrete array vibrating the concrete after insertion of the main anchor, by connecting the main anchor to the planar reinforcement bar array of the slab and vibrating this array and the main anchor into the concrete or by vibratory compaction of the concrete around this reinforcement array upon mechanical connection of the main anchor thereto.

Thus, not only is the latter end of the main anchor embedded in the concrete, but it is also vibrated into the latter in the preferred or best mode embodiment of the invention and, therefore, into the center of the reinforcement ring of the present invention.

Advantageously the reinforcement ring itself can be affixed to the planar reinforcement array of a slab into which an end of a main anchor is vibrated in the manner described above. The ring can be formed so that it is traversed by reinforcement bars of the array or can be connected by any conventional technique to a reinforcement mat or the like.

According to a feature of the invention, the reinforcement ring is disposed on the side of the planar array of reinforcing elements which is turned toward the interior of the panel, i.e. toward the insulation space, the end of the main anchor traversing both the ring and this planar array of reinforcement. It is also possible in accordance with anchor embodiment of the invention to dispose the reinforcement ring on the opposite side of the planar reinforcement array of the slab so that the main anchor first traverses the reinforcement array before it is centered in the ring.

According to the present invention, the ring may have a round configuration and can be seated upon the reinforcing structure of the slab in which the ring is embedded, the main anchor being disposed around or at the centroid of the region surrounded by the ring. Preferably the ring is of circular configuration and surrounds a cylindrical anchor. However other ring configurations such as oval, square or elongated rectangular can be used, corresponding to the shape of the anchor surrounded thereby. The elongated ring configurations can be closed when the anchor has an elongated shape such as is the case with the plate or membrane shaped anchors of may U.S. Pat. No. 3,996,713.

It has been mentioned that the anchor should be so shaped and constructed that it can be vibrated into the concrete slab containing the ring. An anchor which is vibrated into this slab is pressed into the wet concrete mass while being vibrated, the vibration serving to eliminate any depression in the mass and causing the concrete to compact around the anchor and into any openings or passages thereof.

Within the principles of the present invention, the anchor can have a variety of shapes. Preferably the anchor is composed of steel strip or sheet of rectangular configuration and has opposite longitudinal edges of the strip embedded in the respective slabs and provided with perforations penetrated by the concrete when the anchor is vibrated into the slab.

The steel strip can be flat or planar in accordance with the principles of the membrane or plate-type anchors described in the aforementioned patents, in which case the reinforcing ring has a rectangular or oval configuration. Alternatively the steel strip can be rolled into a cylindrical or conical sleeve as is likewise described in these patents. In yet another alternative, the main anchor is a tube section peripherally at its ends.

The present invention is based upon my discovery that, while effective connection of the two slabs together to form the panel can be effected by bonding each main or load-carrying anchor to the planar reinforcement array of the respective slab by reinforcement-securing techniques, e.g. wiring, welding or penetration of a reinforcement bar through the anchor, it is possible to achieve substantially equivalent results and in some cases even better results without a direct bond between the anchor and the reinforcement array if the additional reinforcement ring is provided for each main anchor and is seated upon the slab reinforcement array and surrounds the anchor.

It is indeed surprising that this construction affords static stability without direct bonding of the anchor to the reinforcement array and solely by the centering of the anchor within and its penetration into the regions surrounded by the ring.

Apparently, after hardening of the concrete, the anchor is clamped under pressure within the concrete so that all stresses can be readily absorbed, including and especially those resulting from thermal expansion and contraction. It has been found to be important to limit the spacing of the reinforcing ring from the anchor surrounded thereby. The average distance of the reinforcing ring from the anchor should be, for example, no more than half the major dimension of this anchor in the region surrounded by the ring and in the plane thereof. This major dimension, in the case of a cylindrical anchor is its external diameter and in the case of a reinforcing plate, is the length thereof surrounded by the ring. Preferably the spacing is substantially less than half this major dimension and even less than a third thereof. The correct geometry and dimensions can be ascertained by empirical testing without difficulty although within the limits set forth above, good results are always obtained.

Best results with a circular reinforcing ring are obtained when this ring has a diameter which is equal to the diameter of the cylindrical anchor plus twice the thickness of the plate from which it is formed.

The fabrication of a panel in accordance with the present invention is greatly simplified because of the elimination of any requirement that the anchor be affixed to the reinforcement of the slab.

According to another aspect of the invention, a method of fabricating concrete slab panels in accordance with the invention, comprises the fabrication of a primary slab in a horizontal bed defined by the usual formwork and in the conventional manner, i.e. by assembling the anchors and the reinforcement of the slab and casting the slab. The anchors project from the primary slab sufficiently to enable insulation layers to be provided between the slabs.

After hardening of the primary slab, concrete for a secondary slab is cast around the respective reinforcement array in the formwork, with the reinforcing rings seated on the latter reinforcements. The primary slab is then rotated through 180°, i.e. turned over, and lowered with vibration to vibrate the free ends of the anchors to the fresh concrete of the second slab. Care must be taken to ensure that each anchor lies at the centroid of the respective ring. Upon setting of the concrete of the second slab, the two slabs are connected together with an intervening insulation space.

Advantageously, before the first or primary slab is lowered toward the secondary slab and its anchors are vibrated into the concrete of the latter, any solid insulation layer can be applied to the fresh concrete of the secondary slab, leaving openings through which the anchors can pass. The lowering of the primary slab is effected to the extent necessary to maintain any air space which may be desired.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
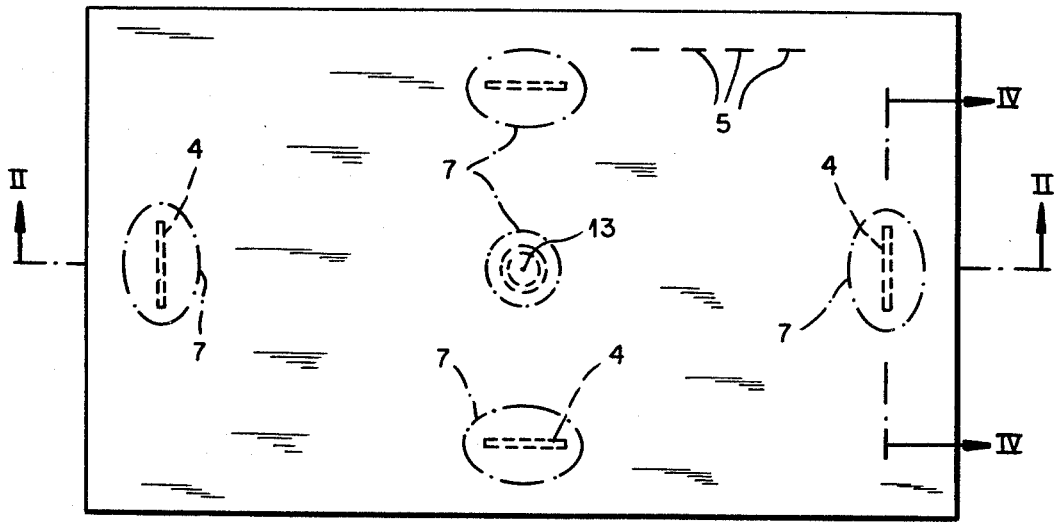
FIG. 1 is a plan view of a panel in accordance with the present invention.
Figure 2:
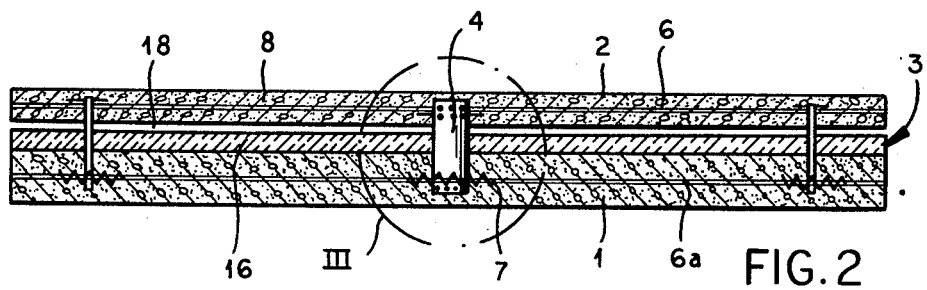
FIG. 2 is a cross-sectional view taken along the line II—II of FIG. 1.

In FIGS. 1 through 4 I have shown a panel adapted to be used as a structural element or as a facade plate in the manner described in the aforementioned patents and which comprises a reinforced concrete inner slab 1, a reinforced concrete outer slab 2 and an insulation space 3 provided with a layer of thermal insulation and an air space. The two slabs are connected by so-called main anchors 4 which primarily serve to take up all the static stresses which may be applied between the slabs and resulting from gravitational forces, expansion and contraction forces and the like. In addition to the main anchors 4 one of which is located at the centroid of the rectangular coextensive slabs, while others are disposed mirror symmetrically on opposite sides thereof, i.e. along the long and short sides of the rectangle, additional or secondary anchors 5 may be provided as diagrammatically represented in FIG. 1 and which serve primarily to prevent spreading of the plates apart.

Each of the concrete slabs 1 and 2 has a respective planar array of reinforcing in the form of a mat 6 or 6a.

The main anchors 4 are embedded in the concrete of the outer slab 2 as well as the inner slab 1 and pass through the insulating space 3.

In the embodiment illustrated in the drawing, the end of each main anchor projecting into the slab 2 is connected to the respective reinforcement while the opposite end of the main anchor is received within a space surrounded by a closed reinforcement ring 7 lying in a plane of the other slab 1 and which may be connected to the reinforcement 6a although the end of the main anchor surrounded by the respective ring is not connected to the reinforcement of this slab directly.

Each main anchor is set in the concrete surrounded by each ring 7 by vibrating it into the freshly poured concrete thereof.

Each main anchor, moreover, is centered within the respective ring 7 and thus is disposed at or is coaxial with the centroid surrounded by the ring.

Each reinforcement ring 7, spaced from the respective anchor 4, is connected to the slab reinforcement on which it is seated, e.g. by pins 9, wire ties or the like. While this connection is preferred it is by no means essential.

In place of the direct connection of each main anchor with the reinforcement of the other slab 2, the latter can be provided with similar rings receiving the respective ends of the main anchor.

Figure 3:
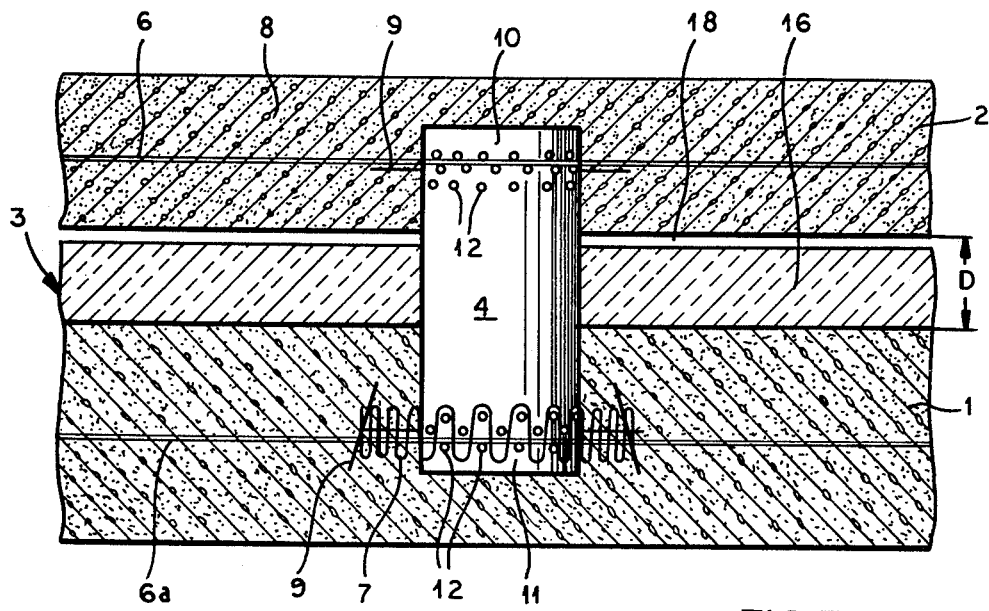
FIG. 3 is a section corresponding to the region III of FIG. 2 drawn to a larger scale.

In the embodiment shown in FIG. 3, each ring 7 lies along the side of the slab reinforcement 6a turned toward the insulation space. In this embodiment as well the inner slab 1 is thicker than the outer slab 2 and serves as a statically bearing element upon which the slab 2 is cantilevered.

The connected end of each main anchor may be connected to the reinforcement 6 of the other slab 2 by pins 9 (see also FIG. 3) and straddle elements of the reinforcement 6, i.e. of the mat.

As FIGS. 1 through 3 and 5 show, when the main anchor 4 is of cylindrical configuration or circular cross section, the ring 7 is likewise of circular configuration. It is composed of a steel wire 7a of a meandering configuration, welded to a wire 7b whose ends are tied together to form the ring.

Figure 4:
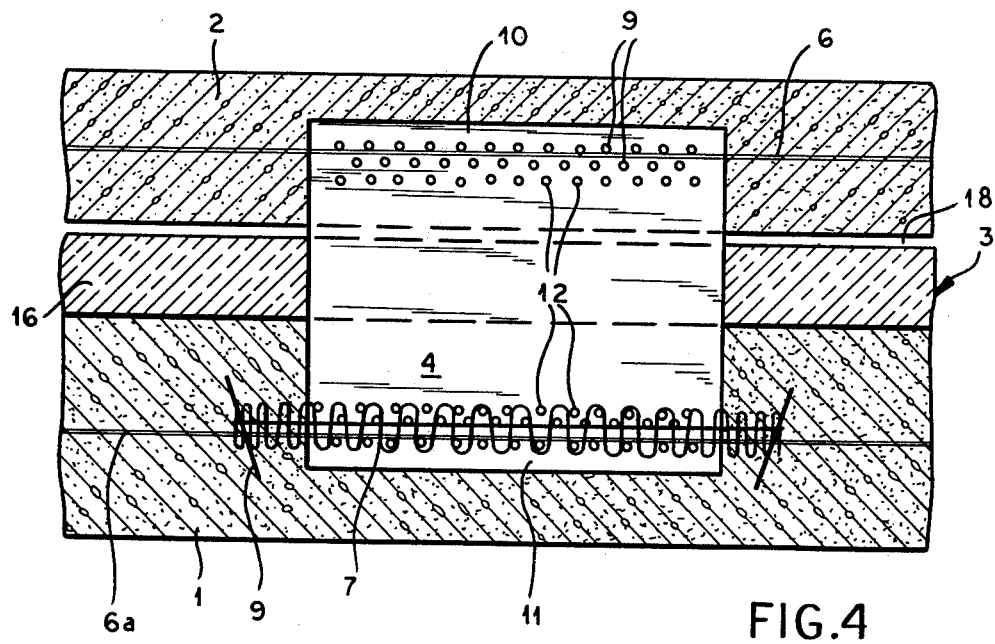
FIG. 4 is a section taken along the line IV—IV of FIG. 1, also drawn to a larger scale.
Figure 5A:
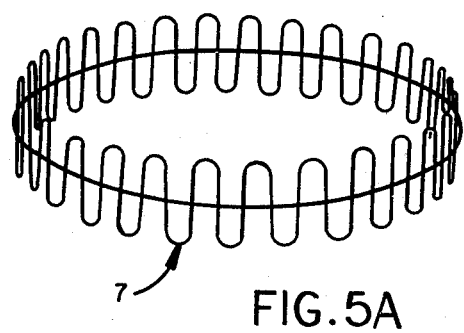
FIG. 5a is a perspective view of a reinforcing ring for use in the present invention.
Figure 5B:
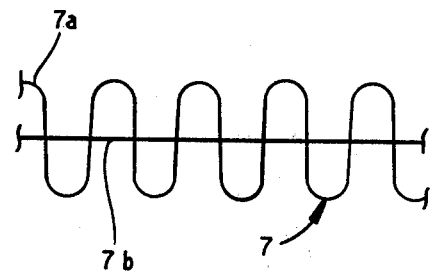
FIG. 5b is a side-elevational view of a portion of this ring.
Figure 6A:
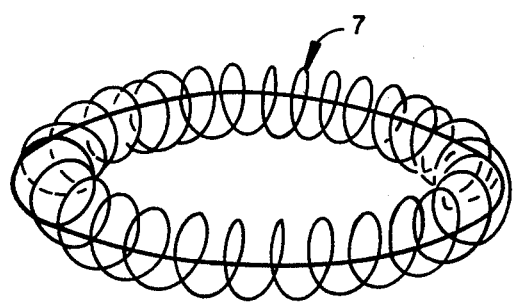
FIGS. 6a and 6b are views similar to FIGS. 5a and 5b showing other embodiments of the ring.
Figure 6B:
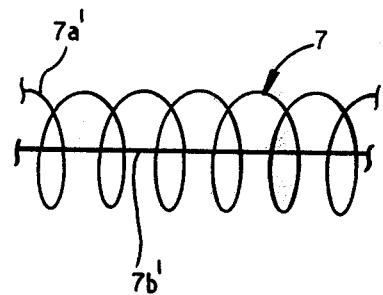

The anchor 4 shown in FIG. 4 is a plate and, because of the elongated nature of this member, the ring 7 surrounding same has an oval configuration and is formed from a coil 7a' welded on one half of the loop to a wire 7b' which has its ends joined together to form the ring.

Eac of the main anchors 4 is composed of steel strip to facilitate vibrating into the concrete and is provided along its upper and lower edges 10 and 11 with the openings 12 which are penetrated by the concrete under the vibrating action mentioned previously.

The auxiliary anchors 5 can be located all around the periphery of the panel (although this has only been indicated diagrammatically in FIG. 1) and can be of hairpin configuration. The flat anchors 4 can be tangential to one or more circles concentric with the centroid 13 of the panel and with the cylindrical anchor 4 disposed therearound. In general, members 7a and 7a' can be considered to be portions running transversely to members 7b and 7b'.

Figure 7:
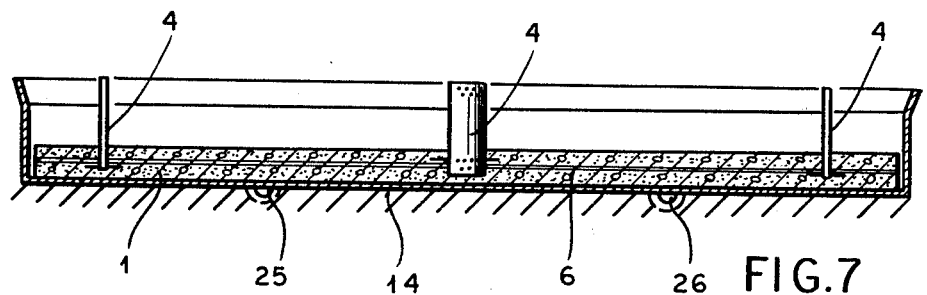
FIGS. 7 through 9 are sections illustrating successive steps in the fabrication of a panel according to the invention.
Figure 8:
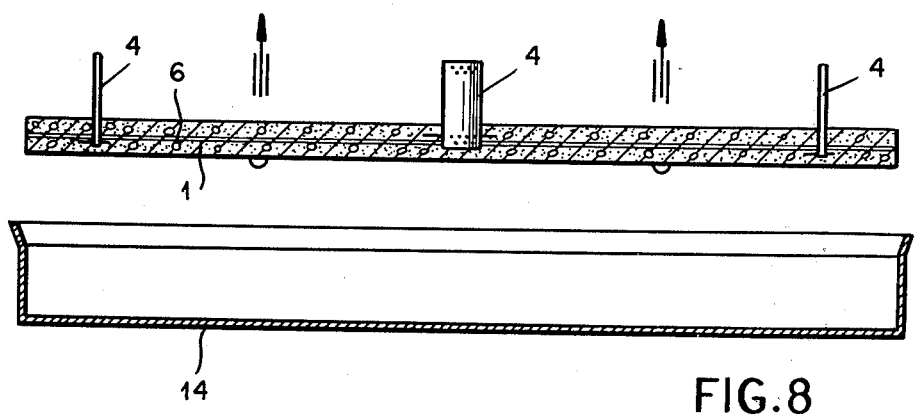
Figure 9:
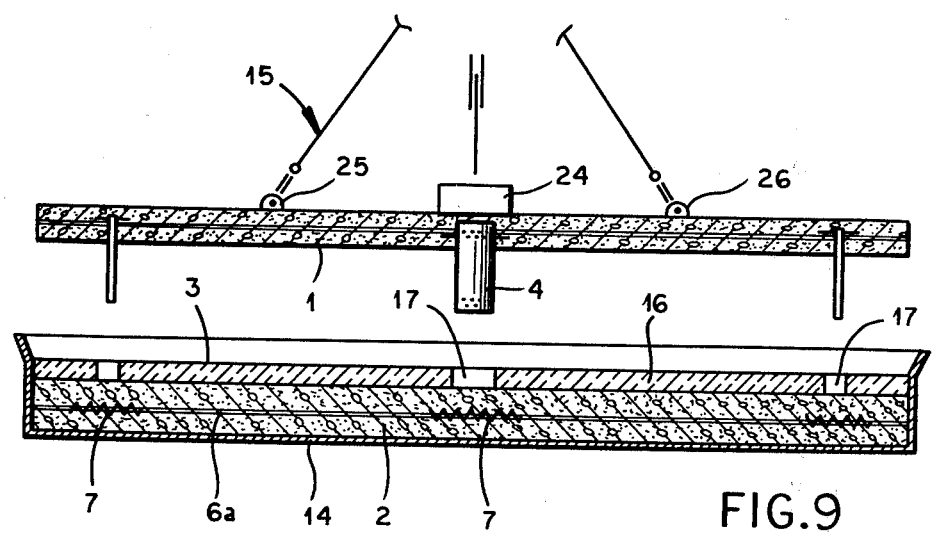

FIGS. 7 through 9 show the method of fabricating panels in accordance with the invention.

Initially the slab reinforcement 13 to which the anchors 4 are affixed, is inserted into the framework bed 14 which has previously been provided with a pair of eyes 25 and 26 so that the free ends of the anchors 4 project upwardly by a distance equal to D plus the depth to which these anchors are to penetrate into the other slab. When the slab shown in FIG. 7 has been poured and sets, it is lifted from the bed 14, rotated through 180°, i.e. turned over, and while being retained by cables 15 of a crane, is lowered toward the other slab 2.

The latter is formed by placing a reinforcement 6a in the formwork 14 after affixing the rings 7 thereto and casting the concrete into the form. Before the concrete has set, an insulating layer 3 is applied, having first been formed with openings 17 intended to pass anchors 4.

Slab 1 is then lowered and vibrated, e.g. by a vibrator 24 disposed on this slab to vibrate each free end of an anchor 4 into the center of the respective ring 7. The slab 1 is lowered until the desired thickness of the air space 18 is maintained above the insulation 16.

I claim:

1. A method of making a composite panel comprising the steps of:
    casting a first reinforced concrete slab in a horizontal formwork bed with tubular anchors projecting from said first slab;
    casting a second reinforced concrete slab in a horizontal formwork bed with convoluted wire reinforcing rings having a ring plane lying in the plane of said second slab disposed at locations corresponding to said tubular anchors, the convolutions of said ring lying transverse to said ring plane; and
    turning over said first slab upon the setting thereof and lowering it toward said second slab prior to the setting thereof and vibrating said anchors into the concrete of said second slab and into the rings thereof.

2. The method defined in claim 1 wherein said rings are secured to the reinforcement of said second slab.

3. The method defined in claim 1, further comprising the step of applying a layer of insulation on the second concrete slab while leaving openings at regions corresponding to said locations.

4. The method defined in claim 3 wherein said first slab is lowered to said second slab and held from contact with said layer to maintain an insulating air gap therebetween.

* * * * *